US012683424B2

(12) United States Patent　　　　　(10) Patent No.:　US 12,683,424 B2
　　　Gothoskar et al.　　　　　　　　　(45) Date of Patent:　Jul. 14, 2026

(54) CHARGER FOR A BATTERY PACK, CHARGING SYSTEM AND METHOD OF CHARGING

(71) Applicant: 3M INNOVATIVE PROPERTIES COMPANY, St. Paul, MN (US)

(72) Inventors: Gaurav M. Gothoskar, Waxhaw, NC (US); Erik J. Hatinen, Monroe, NC (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 219 days.

(21) Appl. No.: 18/273,752

(22) PCT Filed: Jan. 21, 2022

(86) PCT No.: PCT/IB2022/050528
　　§ 371 (c)(1),
　　(2) Date: Jul. 21, 2023

(87) PCT Pub. No.: WO2022/167887
　　PCT Pub. Date: Aug. 11, 2022

(65) Prior Publication Data
　　US 2024/0097479 A1　　Mar. 21, 2024

Related U.S. Application Data

(60) Provisional application No. 63/199,972, filed on Feb. 5, 2021.

(51) Int. Cl.
　　*H02J 7/96*　　　　(2026.01)
　　*H01M 10/44*　　　(2006.01)
　　　　(Continued)

(52) U.S. Cl.
　　CPC ........... *H02J 7/965* (2026.01); *H01M 10/441* (2013.01); *H01M 10/482* (2013.01); *H02J 7/448* (2026.01)

(58) Field of Classification Search
　　CPC ........ H02J 7/965; H02J 7/448; H01M 10/441; H01M 10/482
　　　　(Continued)

(56) References Cited

U.S. PATENT DOCUMENTS

| 6,188,554 | B1 | 2/2001 | Chung |
| 2004/0257037 | A1 | 12/2004 | Hartung et al. |

(Continued)

FOREIGN PATENT DOCUMENTS

| CN | 110050400 | 7/2008 |
| CN | 106558873 A | 4/2017 |

(Continued)

OTHER PUBLICATIONS

International Search Report for PCT International Application No. PCT/IB2022/050528, mailed on Apr. 28, 2022, 4 pages.

*Primary Examiner* — Michael R. Fin
(74) *Attorney, Agent, or Firm* — Katherine M. Scholz; David B. Patchett

(57) ABSTRACT

The present disclosure provides a charger for a battery pack. The battery pack includes a battery input line, a battery sense line electrically connected to the battery input line, and one or more electrochemical cells electrically connected to the battery input line. The charger includes a charger integrated circuit (IC) including an input pin, an output pin, and a sense pin. The charger further includes a charger output line electrically connected to the output pin of the charger IC. The charger output line is electrically connected to the battery input line upon coupling of the battery pack to the charger. The charger further includes a charger sense line electrically connected to the battery sense line upon coupling of the battery pack to the charger. The charger also includes an analog switch electrically disposed between the charger sense line and the battery sense line.

20 Claims, 7 Drawing Sheets

(51) Int. Cl.
    *H01M 10/48*          (2006.01)
    *H02J 7/40*           (2026.01)

(58) Field of Classification Search
    USPC ........................................................ 320/112
    See application file for complete search history.

(56) References Cited

U.S. PATENT DOCUMENTS

| | | |
|---|---|---|
| 2008/0169705 A1 | 7/2008 | Tan et al. |
| 2012/0200251 A1 | 8/2012 | Chishima et al. |
| 2015/0207353 A1 | 7/2015 | Oku et al. |
| 2016/0093921 A1* | 3/2016 | Kadirvel ............. H01M 10/425 |
| | | 429/61 |
| 2017/0373514 A1 | 12/2017 | Troberg et al. |
| 2020/0119568 A1 | 4/2020 | Li |
| 2020/0153055 A1* | 5/2020 | Moon ................... H01M 10/48 |
| 2021/0135308 A1* | 5/2021 | Hwang ............. H01M 10/6572 |

FOREIGN PATENT DOCUMENTS

| | | | |
|---|---|---|---|
| JP | 3778872 | B2 | 5/2006 |
| JP | 5492464 | B2 | 5/2014 |
| WO | 2014050152 | | 4/2014 |

* cited by examiner

400

402 ELECTRICALLY DISCONNECT SENSE PIN OF CHARGER IC FROM CHARGER SENSE LINE OF CHARGER WHEN BATTERY PACK IS DISCONNECTED FROM CHARGER

404 ELECTRICALLY CONNECT SENSE PIN OF CHARGER IC TO CHARGER SENSE LINE UPON SENSING BATTERY PACK

406 PROVIDE OUTPUT VOLTAGE AT CHARGER OUTPUT LINE

CHARGER FOR A BATTERY PACK, CHARGING SYSTEM AND METHOD OF CHARGING

CROSS REFERENCE TO RELATED APPLICATIONS

This application is a national stage filing under 35 U.S.C. 371 of PCT/IB2022/050528, filed Jan. 21, 2022, which claims the benefit of U.S. Provisional Patent Application No. 63/199,972, filed Feb. 5, 2021, the disclosure of which is incorporated by reference in its/their entirety herein.

TECHNICAL FIELD

The present disclosure relates generally to charging of a battery pack, and in particular, to a charger for a battery pack, a charging system including the charger, and a method of charging a battery pack.

BACKGROUND

Battery pack of an equipment or a device is generally charged by a charger having a charging integrated circuit (IC). The charger IC may charge electrochemical cells of the battery pack. From an intrinsic safety standpoint, the electrochemical cells may have a potential of discharging into the charger IC in an event of a fault. This may cause thermal concerns if the device is present in a hazardous location.

SUMMARY

In a first aspect, the present disclosure provides a charger for a battery pack. The battery pack includes a battery input line, a battery sense line electrically connected to the battery input line, and one or more electrochemical cells electrically connected to the battery input line. The charger includes a charger integrated circuit (IC) including an input pin, an output pin, and a sense pin. The input pin is configured to be electrically connected to a power source. The charger IC is configured to provide an output voltage at the output pin. The charger further includes a charger output line electrically connected to the output pin of the charger IC. The charger output line is configured to be electrically connected to the battery input line upon coupling of the battery pack to the charger. The charger also includes a charger sense line configured to be electrically connected to the battery sense line upon coupling of the battery pack to the charger. The charger further includes an analog switch electrically disposed between the charger sense line and the battery sense line. The analog switch is configured to electrically disconnect the sense pin from the charger sense line when the battery pack is disconnected from the charger. The analog switch is configured to electrically connect the sense pin of the charger IC to the battery sense line of the battery pack upon sensing of the battery pack by the charger. The charger IC is configured to control the output voltage based on a voltage detected at the sense pin of the charger IC.

In a second aspect, the present disclosure provides a charging system. The charging system includes a battery pack and a charger configured to be selectively coupled to the battery pack. The battery pack includes a battery input line, one or more electrochemical cells electrically connected to the battery input line, at least one blocking device, and a battery sense line. The at least one blocking device is disposed in the battery input line and configured to allow a unidirectional flow of current from the battery input line to the one or more electrochemical cells. The battery sense line is electrically connected to the battery input line between the one or more electrochemical cells and the at least one blocking device. The battery sense line is configured to detect a voltage drop across the at least one blocking device. The charger includes a charger integrated circuit (IC) including an input pin, an output pin, and a sense pin. The input pin is configured to be electrically connected to a power source. The charger IC is configured to provide an output voltage at the output pin. The charger further includes a charger output line electrically connected to the output pin of the charger IC. The charger output line is configured to be electrically connected to the battery input line upon coupling of the battery pack to the charger. The charger also includes a charger sense line configured to be electrically connected to the battery sense line upon coupling of the battery pack to the charger. The charger further includes an analog switch electrically disposed between the charger sense line and the battery sense line. The analog switch is configured to electrically disconnect the sense pin from the charger sense line when the battery pack is disconnected from the charger. The analog switch is configured to electrically connect the sense pin of the charger IC to the battery sense line of the battery pack upon sensing of the battery pack by the charger. The charger IC is configured to control the output voltage based on a voltage detected at the sense pin of the charger IC. The voltage detected at the sense pin of the charger IC is based on the voltage drop across the at least one blocking device.

In a third aspect, the present disclosure provides a method of charging a battery pack using a charger having a charger integrated circuit (IC). The method includes electrically disconnecting, by an analog switch, a sense pin of the charger IC from a charger sense line of the charger when the battery pack is disconnected from the charger. The method further includes electrically connecting, by the analog switch, the sense pin of the charger IC to the charger sense line upon sensing the battery pack. The method further includes providing, by the charger IC, an output voltage at a charger output line based on a voltage detected at the sense pin of the charger. The charger output line is electrically connected to one or more electrochemical cells of the battery pack upon coupling of the battery pack to the charger.

BRIEF DESCRIPTION OF THE DRAWINGS

Exemplary embodiments disclosed herein may be more completely understood in consideration of the following detailed description in connection with the following figures. The figures are not necessarily drawn to scale. Like numbers used in the figures refer to like components. However, it will be understood that the use of a number to refer to a component in a given figure is not intended to limit the component in another figure labeled with the same number.

DETAILED DESCRIPTION

Figure 1A:
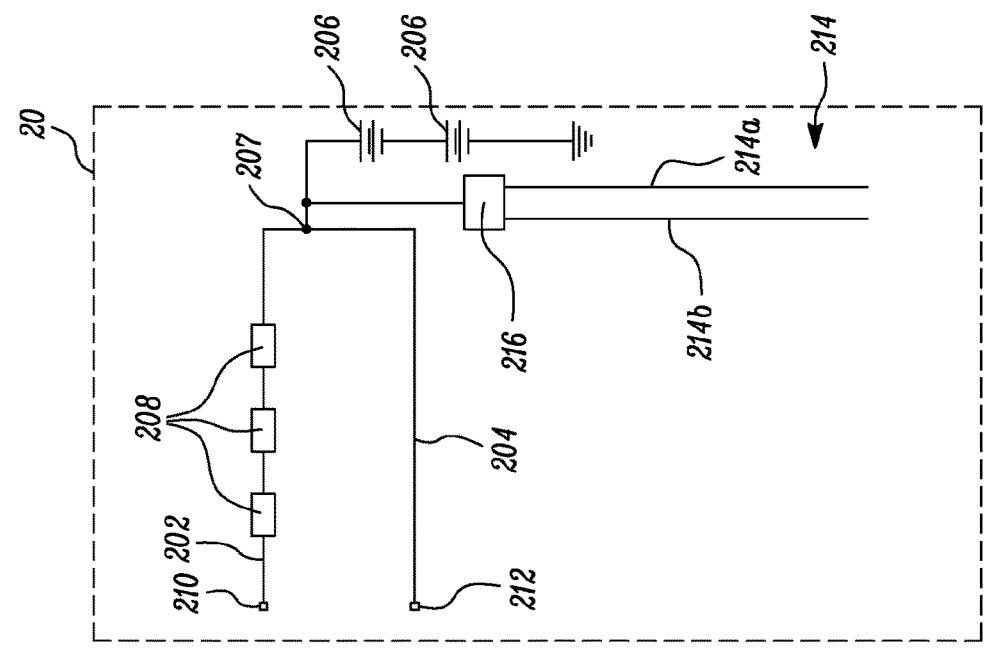
FIG. 1A is a block diagram of a charging system for a battery pack, wherein the battery pack is disconnected from a charger, according to an embodiment of the present disclosure.
Figure 1A:
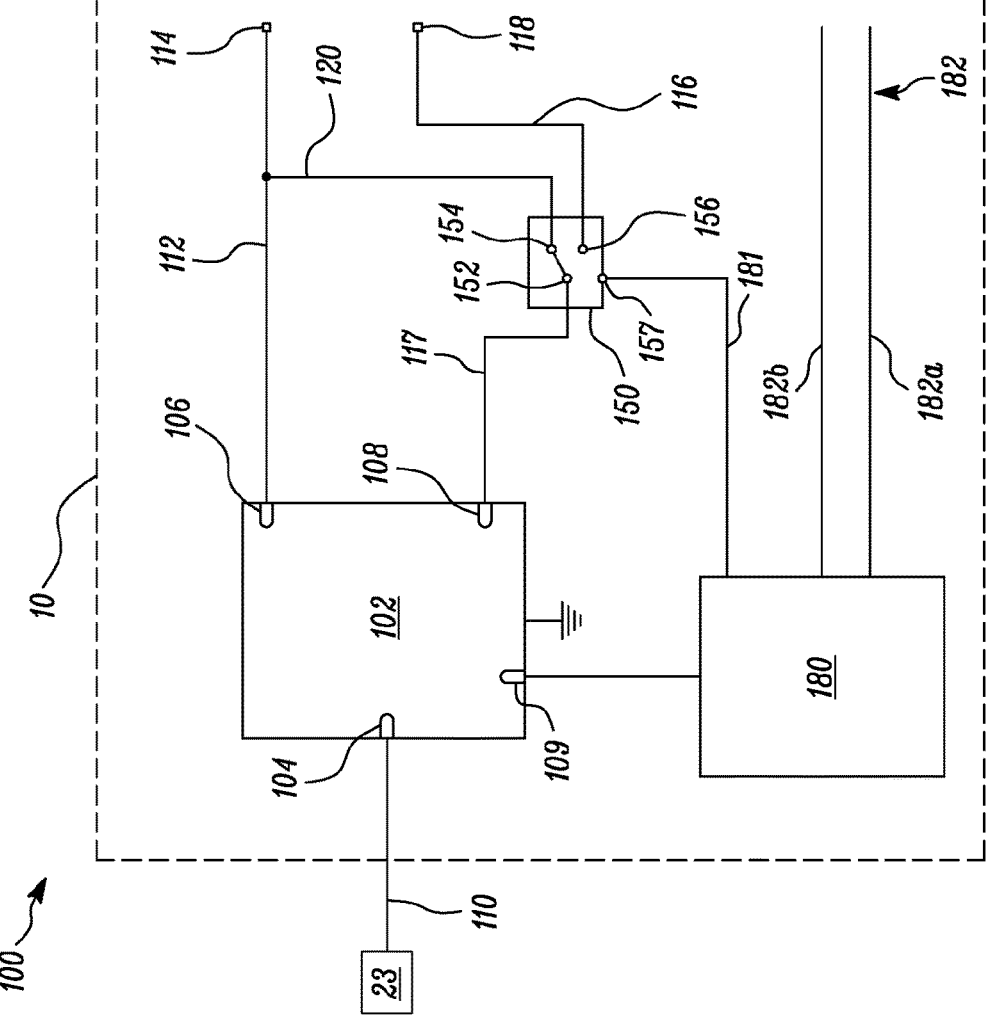

In the following description, reference is made to the accompanying figures that form a part thereof and in which various embodiments are shown by way of illustration. It is to be understood that other embodiments are contemplated and may be made without departing from the scope or spirit of the present disclosure. The following detailed description, therefore, is not to be taken in a limiting sense.

The present disclosure relates to a charger for a battery pack, a charging system including the charger, and a method of charging the battery pack. The charger may be used to charge a battery pack associated with various types of devices, such as a personal protective equipment (PPE), a self-contained breathing apparatus (SCBA), a personal alert safety system (PASS), a powered air purifying respirator (PAPR), light emitting diode (LED) searchlights, electric torches, wearable devices, power tools, video cameras, and other portable electronic devices.

While charging the battery pack of a device by using a charger, a charging integrated circuit (IC) of the charger is generally present or at least partially received in the device and charges one or more rechargeable electrochemical cells of the battery pack. In some cases, the electrochemical cells may discharge into the charger IC in an event of a fault. The charger IC may be heated thermally when the electrochemical cells discharge through the charger IC in the event of the fault, causing dissipation of power in the charger IC. The discharging of the electrochemical cells into the charger IC may cause thermal concerns if the device is present in a hazardous location. Moreover, a charging path through which the electrochemical cells can discharge may be a low impedance path, which may further support the discharging of the electrochemical cells into the charger IC.

One of the conventional ways to counter the discharging of the electrochemical cells into the charger IC is to insert a plurality of reverse diodes in the charging path of the battery pack, such that there is no discharging from the electrochemical cells to the charger IC. However, the insertion of the diodes typically generates a forward drop across the diodes, that may prevent a full charger voltage to be applied on the electrochemical cells. Thus, the electrochemical cells may never be fully charged in the presence of the diodes. This may have a negative impact on the battery pack run time. Therefore, the insertion of the diodes may have a negative effect on the charging of the battery pack.

The charger of the present disclosure is used for charging a battery pack including a battery input line, a battery sense line electrically connected to the battery input line, and one or more electrochemical cells electrically connected to the battery input line. The charger includes a charger integrated circuit (IC) including an input pin, an output pin, and a sense pin. The input pin is configured to be electrically connected to a power source. The charger IC is configured to provide an output voltage at the output pin. The charger further includes a charger output line electrically connected to the output pin of the charger IC. The charger output line is configured to be electrically connected to the battery input line upon coupling of the battery pack to the charger. The charger also includes a charger sense line configured to be electrically connected to the battery sense line upon coupling of the battery pack to the charger. The charger further includes an analog switch electrically disposed between the charger sense line and the battery sense line. The analog switch is configured to electrically disconnect the sense pin from the charger sense line when the battery pack is disconnected from the charger. The analog switch is configured to electrically connect the sense pin of the charger IC to the battery sense line of the battery pack upon sensing of the battery pack by the charger. The charger IC is configured to control the output voltage based on a voltage detected at the sense pin of the charger IC.

In some cases, the battery pack may be provided with at least one blocking device to prevent reverse flow of current or charge from the battery pack to the charger IC of the charger. The charger IC includes the sense pin to sense a voltage in the battery sense line via the charger sense line. The voltage sensed by the sense pin may provide a voltage drop across the at least one blocking device. Hence, the charger IC can regulate the output voltage such that the one or more electrochemical cells of the battery pack may receive an optimal charging voltage. However, by this approach, the charger sense line can be left open when the battery pack is removed. An open condition of the charger sense line may leave the output voltage unregulated and may cause a damage to the charger IC. The analog switch of the present disclosure may prevent an open and unregulated condition of the charger sense line by electrically disconnecting the sense pin from the charger sense line when the battery pack is disconnected from the charger. The analog switch is configured to electrically connect the sense pin of the charger IC to the battery sense line of the battery pack upon sensing of the battery pack by the charger. This may enable the charger IC to control the output voltage based on the voltage detected at the sense pin of the charger IC.

The present disclosure further provides a charging system. The charging system includes the battery pack and the charger configured to be selectively coupled to the battery pack. The battery pack includes the battery input line, the one or more electrochemical cells electrically connected to the battery input line, at least one blocking device, and the battery sense line. The at least one blocking device is disposed in the battery input line and configured to allow a unidirectional flow of current from the battery input line to the one or more electrochemical cells. The battery sense line is electrically connected to the battery input line between the one or more electrochemical cells and the at least one blocking device. The battery sense line is configured to detect a voltage drop across the at least one blocking device. The voltage detected at the sense pin of the charger IC is based on the voltage drop across the at least one blocking device.

The at least one blocking device in the battery input line may prevent discharging of the electrochemical cells into the charger IC. Thus, the insertion of the at least one blocking device may prevent a thermal event in a hazardous location. However, the insertion of the at least one blocking device may generate a voltage drop across the at least one blocking device, that may otherwise prevent full charging of the electrochemical cells. The voltage drop across the at least one blocking device is detected by the battery sense line. Upon coupling of the battery pack to the charger, the charger sense line is connected to the battery sense line. Thus, upon sensing of the battery pack by the charger, the analog switch electrically connects the sense pin of the charger IC to the battery sense line. Therefore, the sense pin of the charger IC may indicate, from the battery sense line, an amount of voltage drop across the at least one blocking device. Hence, the charger IC may select and regulate a desired output voltage for optimal charging of the battery pack, based on the amount of voltage drop across the at least one blocking device.

Further, once the battery pack is disconnected from the charger, the analog switch electrically disconnects the sense pin from the charger sense line, and electrically connects the sense pin to the charger output line. The electrical connection of the sense pin and the charger output line, via the analog switch, may prevent an unregulated charger output voltage. In other words, upon disconnection of the battery pack from the charger, the analog switch may electrically disconnect the sense pin from the charger sense line, while electrically connecting the sense pin to the charger output line. This may prevent any damage to the charger IC due to an otherwise open condition of the charger sense line and an unregulated charger output voltage.

Further, for a fully charged battery pack or a battery pack whose safety switch is engaged due to a prior faulty condition, and coupled to the charger, an output voltage provided by the charger may not be able to compensate for the voltage drop across the at least one blocking device. Therefore, the output voltage may not be able to compensate for the voltage drop as the charger may not be sensing the voltage drop, and safety switch is not flipped. Therefore, the battery pack may fail to begin charging. For example, in some cases, the charger may be unable to detect or charge the battery pack if the battery pack is in a dead battery condition or an inactive state.

The charging system further includes a voltage regulator electrically connected to the analog switch. The analog switch is further configured to electrically connect the voltage regulator to the charger sense line until the battery pack is sensed by the charger. Therefore, for the battery pack in the dead battery condition or the battery pack whose safety switch is engaged due to a prior faulty condition, the voltage regulator may provide a regulated voltage at a low current to the charger and battery sense lines to wake up or activate the battery pack. In other words, for the battery pack coupled to the charger in the dead battery condition, the voltage regulator may provide a reviving voltage, via the battery sense line, to activate the battery pack. After the battery pack receives a reviving voltage, the voltage regulator is disconnected from the analog switch, and the charger may provide a required output voltage to the battery pack.

The voltage regulator may provide the regulated voltage via a low impedance path provided by the charger sense line and the battery sense line, thereby bypassing the at least one blocking device. Therefore, a relative low voltage can be used to activate the battery pack. Once the battery pack is activated, the analog switch may electrically disconnect the voltage regulator from the charger sense line, while electrically connecting the charger sense line to the sense pin of the charger IC. The charger IC can then initiate charging of the battery pack by a regulated output voltage based on the voltage sensed at the sense pin.

Figure 1B:
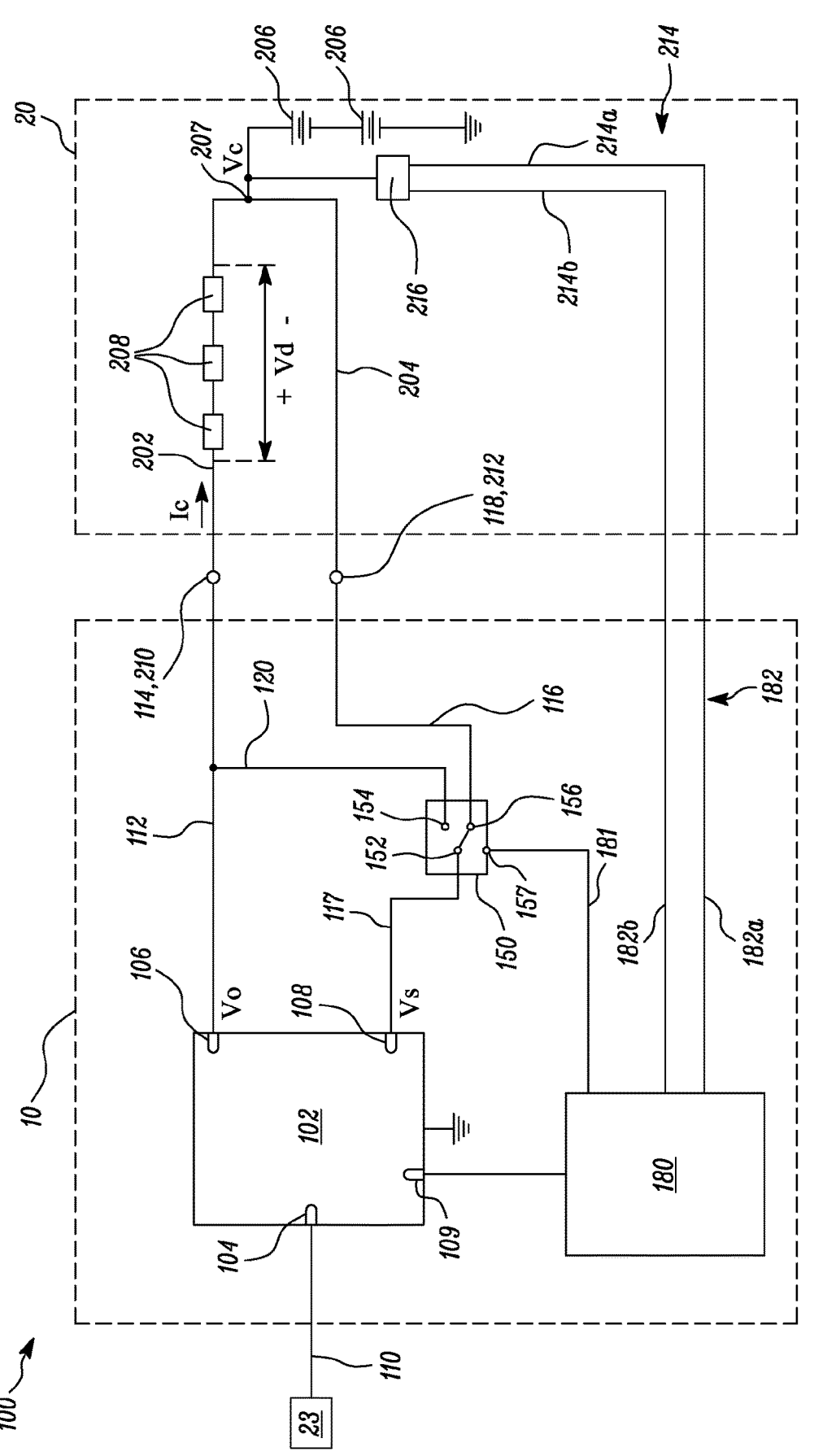
FIG. 1B is a block diagram of the charging system of FIG. 1A, wherein the battery pack is coupled to the charger.

Referring now to Figures, FIGS. 1A and 1B illustrate a charging system 100 including a charger 10 for a battery pack 20, according to an embodiment of the present disclosure.

The charger 10 is configured to be selectively coupled to the battery pack 20. Therefore, the battery pack 20 can be detachably electrically connected to the charger 10 that charges the battery pack 20. With reference to FIG. 1A, the battery pack 20 is disconnected from the charger 10. With reference to FIG. 1B, the battery pack 20 is coupled to the charger 10.

The battery pack 20 may provide power supply to a device or an equipment which includes or is electrically coupled to the battery pack 20. In some embodiments, the battery pack 20 may provide electrical power to a personal protective equipment (PPE), for example, a self-contained breathing apparatus (SCBA), a personal alert safety system (PASS), a powered air purifying respirator (PAPR), and so forth. In some embodiments, the charging system 100 may allow in situ charging of the battery pack 20, i.e., the battery pack 20 can be charged while being electrically coupled with or inserted within the device that is being powered. In some cases, the battery pack 20 and the charger 10 may have to conform to certain safety standards applicable to the devices (e.g., a PPE) being charged in order to allow in situ charging. In some embodiments, the battery pack 20 and the charger 10 may be intrinsically safe to enable in situ charging in such devices.

The battery pack 20 includes a battery input line 202, a battery sense line 204 electrically connected to the battery input line 202, one or more electrochemical cells 206 electrically connected to the battery input line 202, and at least one blocking device 208 disposed in the battery input line 202. In some embodiments, the battery pack 20 may also include a resistor (not shown) serving as a battery pack voltage detection means for measuring a voltage across the battery pack 20, a thermistor (not shown) for detecting a surface temperature of the battery pack 20, and a battery pack temperature detection terminal (not shown) for supplying the charger 10 with an information pertaining to a temperature of the battery pack 20. In some embodiments, the battery input and sense lines 202, 204 may include one or more resistors (not shown).

In some embodiments, the battery pack 20 further includes a battery input terminal 210 electrically connected to the battery input line 202, and a battery sense terminal 212 electrically connected to the battery sense line 204. The battery input and sense terminals 210, 212 are used to couple the battery pack 20 to the charger 10.

With continued reference to FIGS. 1A and 1B, the one or more electrochemical cells 206 include two rechargeable (i.e., chargeable/dischargeable) electrochemical cells 206 connected in series with each other. In some embodiments, the battery pack 20 may include more than two rechargeable electrochemical cells 206 connected in series with each other. In some other embodiments, the battery pack 20 may include any number of the electrochemical cells 206 arranged in any suitable series and/or parallel combination based on application requirements. In some embodiments, the electrochemical cells 206 are Lithium-ion rechargeable electrochemical cells.

In some embodiments, the one or more electrochemical cells 206 are electrically connected to a node 207 that is electrically disposed between the at least one blocking device 208 and the one or more electrochemical cells 206.

In some embodiments, the at least one blocking device 208 is configured to allow a unidirectional flow of current from the battery input line 202 to the one or more electrochemical cells 206. In some embodiments, the at least one blocking device 208 includes a plurality of blocking devices 208 connected in series with each other. In some embodiments, the at least one blocking device 208 includes a silicon diode or a Schottky diode or an electronic relay, or a combination thereof. In the illustrated embodiment of FIGS. 1A and 1B, the battery pack 20 includes three blocking devices 208 connected in series with each other. In some other embodiments, the battery pack 20 may include more than three blocking devices 208 connected in series with each other.

In some embodiments, the battery pack 20 further includes one or more battery communication lines 214. In some embodiments, the battery pack 20 further includes a fuel gauge integrated circuit (IC) 216 electrically connected to the one or more battery communication lines 214 and the one or more electrochemical cells 206. In some embodiments, the fuel gauge IC 216 is configured to selectively output communication signals based on one or more parameters of the one or more electrochemical cells 206. Specifically, the fuel gauge IC 216 outputs the communication signals based on parameters, such as battery pack voltage, battery pack current, battery pack temperature, etc. In some embodiments, the fuel gauge IC 216 is electrically connected to the node 207 that is electrically disposed between the at least one blocking device 208 and the one or more electrochemical cells 206.

In some embodiments, the fuel gauge IC 216 may determine a state-of-charge of the battery pack 20, and may predict how much longer, under specific operating conditions, the battery pack 20 can continue to provide power. In some embodiments, the fuel gauge IC 216 may further determine a state-of-health of the battery pack 20, and may provide a notification in case of deviation in the state-of-health of the battery pack 20 from a standard state-of-health of the battery pack 20.

In some other embodiments, the fuel gauge IC 216 may monitor the battery pack voltage, current and temperature. In some other embodiments, the fuel gauge IC 216 may store all relevant information pertaining to the battery pack 20 in an associated memory element for retrieval by a controller.

In some embodiments, the battery pack 20 is configured to switch between an active state and an inactive state. In some embodiments, the fuel gauge IC 216 outputs the communication signals in the active state of the battery pack 20, and the fuel gauge IC 216 does not output the communication signals in the inactive state of the battery pack 20. For example, the inactive state of the battery pack 20 may correspond to a dead battery condition of the battery pack 20. Thus, the fuel gauge IC 216 does not output the communication signals when the battery pack 20 is in the dead battery condition.

In some embodiments, the battery communication lines 214 are inter-integrated circuit (I2C) communication lines. Generally, the I2C communication lines transfer data between a controller and one or more ICs in an electronic circuit. With reference to FIGS. 1A and 1B, the battery communication lines 214 include at least a battery serial data (SDA) line 214*a* and a battery serial clock (SCL) line 214*b*. In some embodiments, the battery communication lines 214 may include another line which is ground or 0 volts. Generally, an SDA line is used to transfer relevant data between a master controller and a slave device. Generally, an SCL line carries a clock signal which can synchronize data transfer between the master controller and the slave device.

In general, I2C communication is a serial protocol for two-wire interface to connect low-speed devices like microcontrollers, electrically erasable programmable read-only memories (EEPROMs), analog-to-digital (A/D) and (digital-to-analog) D/A converters, input-output (I/O) interfaces and other similar peripherals in embedded systems. I2C communication can be used to connect an almost unlimited number of devices, including at least one master device and at least one slave device. Each I2C slave device has a unique address, and the master device can have access to the unique address, such that the master device can read or write data at the address of a particular slave device. Serial data is generally transferred from and to the master device. Serial data is typically split into 8-bit packets.

The charger 10 supplies power to the electrochemical cells 206 via the battery input line 202. In some embodiments, the battery sense line 204 is electrically connected to the battery input line 202 between the one or more electrochemical cells 206 and the at least one blocking device 208.

With continued reference to FIGS. 1A and 1B, the charger 10 includes a charger IC 102 including an input pin 104, an output pin 106, and a sense pin 108. In some embodiments, the charger IC 102 is an integrated host-controlled charge controller. In some embodiments, the charger IC 102 is an integrated host-controlled charge controller with two integrated N-channel power metal-oxide-semiconductor field-effect transistors (MOSFETs). In some embodiments, the charger IC 102 provides a constant-frequency synchronous pulse width modulator (PWM) controller with high accuracy regulation of charge current and voltage. In some embodiments, the charger IC 102 may monitor a temperature of the battery pack 20 to allow the charging only in a preset temperature window. In some embodiments, the charger IC 102 may include a thermal regulation loop to modulate the charge current to maintain a predetermined junction temperature during the charging of the battery pack 20. In some embodiments, the charger IC 102 may include other pins in addition to the input pin 104, the output pin 106, and the sense pin 108. The other pins may include a charging status pin, a temperature qualification pin, a charge mode selection pin, a cell selection pin, an analog pin, and the like. In some embodiments, the charger IC 102 further includes an enable pin 109. The charger IC 102 can be activated or deactivated by providing a control signal at the enable pin 109.

The input pin 104 is configured to be electrically connected to a power source 23. The charger 10 further includes a power supply line 110 configured to supply electrical power from the power source 23 to the input pin 104 of the charger IC 102. In some embodiments, the electrical power is supplied from the power source 23 to the input pin 104 through a current limiting resistor (not shown). In some embodiments, the power source 23 may be a 240V wall unit. In some other embodiments, the input pin 104 may receive the electrical power from the power source 23 via a power brick (not shown) associated with the charger 10.

The charger IC 102 is configured to provide an output voltage "Vo" at the output pin 106. In some embodiments, the charger IC 102 is configured to control the output voltage "Vo" based on a voltage "Vs" detected at the sense pin 108 of the charger IC 102. Specifically, the voltage "Vs" detected at the sense pin 108 of the charger IC 102 is based on a voltage drop "Vd" across the at least one blocking device 208. For example, the voltage "Vs" detected at the sense pin 108 may be substantially equal to a difference between the output voltage "Vo" and the voltage drop "Vd", i.e., Vs=Vo−Vd. The battery sense line 204 is configured to detect the voltage drop "Vd" across the at least one blocking device 208. For example, for a battery pack 20 that requires a battery voltage "Vb" for full charging, the output voltage "Vo" is a function of sum of the voltage drop "Vd" and the battery voltage "Vb".

Therefore, by detecting the voltage drop "Vd" across the at least one blocking device 208 and the voltage "Vs" at the sense pin 108, the charger IC 102 can select and provide the required output voltage "Vo" at the output pin 106. In an example, the output voltage "Vo" may be greater than or equal to a sum of the battery voltage "Vb" and the drop voltage "Vd", i.e., Vo≥Vb+Vd.

In some embodiments, the one or more electrochemical cells 206 may be charged by a charging voltage "Vc" applied at the node 207. In some cases, the charging voltage "Vc" may be substantially equal to the battery voltage "Vb". Further, the at least one blocking device 208 may allow a unidirectional flow of a charging current "Ic" from the charger output line 112 to the one or more electrochemical cells 206 of the battery pack 20 for charging the one or more electrochemical cells 206.

In some embodiments, the charger 10 further includes a charger output line 112 electrically connected to the output pin 106 of the charger IC 102. The output voltage "Vo" provided at the output pin 106 is further applied through the charger output line 112. In some embodiments, the charger output line 112 is configured to be electrically connected to the battery input line 202 upon coupling of the battery pack 20 to the charger 10. With reference to FIG. 1B, the charger output line 112 is electrically connected to the battery input line 202 when the battery pack 20 is electrically coupled to the charger 10. In other words, upon coupling of the battery pack 20 to the charger 10, the output voltage "Vo" is applied on the battery input line 202 and the power is supplied to the one or more electrochemical cells 206. In some embodiments, the charger output line 112 may further include one or more resistors (not shown).

The charger 10 further includes a charger output terminal 114 electrically connected to the charger output line 112 and configured to be electrically connected to the battery input line 202. Specifically, with reference to FIG. 1B, upon coupling of the battery pack 20 to the charger 10, the charger output terminal 114 is electrically connected to the battery input terminal 210. Further, upon coupling of the battery pack 20 to the charger 10, the charger output line 112 is electrically connected to the battery input line 202, via an electrical connection between the charger output terminal 114 and the battery input terminal 210.

In some embodiments, the charger 10 includes a charger sense line 116 configured to be electrically connected to the battery sense line 204 upon coupling of the battery pack 20 to the charger 10. With reference to FIG. 1B, the charger sense line 116 is electrically connected to the battery sense line 204 upon coupling of the battery pack 20 to the charger 10. Further, in some embodiments, the charger 10 also includes a charger sense terminal 118 electrically connected to the charger sense line 116 and configured to be electrically connected to the battery sense line 204. Specifically, upon coupling of the battery pack 20 to the charger 10, the charger sense terminal 118 is electrically connected to the battery sense terminal 212. Further, upon coupling of the battery pack 20 to the charger 10, the charger sense line 116 is electrically connected to the battery sense line 204, via an electrical connection between the charger sense terminal 118 and the battery sense terminal 212.

Referring to FIGS. 1A and 1B, in some embodiments, the charger 10 further includes an analog switch 150 electrically disposed between the charger sense line 116 and the battery sense line 204. Specifically, the analog switch is disposed between a connecting section 117 of the charger sense line 116 and the battery sense line 204. Further, the analog switch 150 is disposed between the connecting section 117 of the charger sense line 116 and the charger sense terminal 118. In some embodiments, the analog switch 150 may be a low resistance switch. In some embodiments, the analog switch 150 is a single-pole-double throw analog switch. In some other embodiments, the analog switch 150 is a single-poletriple throw analog switch. In some embodiments, the analog switch 150 may be implemented by using a field effect transistor.

In some embodiments, the charger 10 further includes a microcontroller 180 electrically connected to at least the charger IC 102 and the analog switch 150. The microcontroller 180 is configured to sense the battery pack 20. In some embodiments, the microcontroller 180 is electrically connected to the analog switch 150 by a control line 181. A switch state of the analog switch 150 is generally controlled using an output of the microcontroller 180. While the subject matter is described using a microcontroller, other types of processing or discrete logic can be used for the microcontroller function, including, but not limited to, a processor or microprocessor.

In some embodiments, the microcontroller 180 is further configured to deactivate the charger IC 102 until the battery pack 20 is sensed by the microcontroller 180. In some embodiments, the microcontroller 180 is further configured to activate the charger IC 102 upon sensing the battery pack 20. In the illustrated embodiment, the microcontroller 180 is electrically connected to the enable pin 109 of the charger IC 102. The microcontroller 180 can disable or enable the charger IC 102 by providing a control signal at the enable pin 109.

In some embodiments, the charger 10 further includes one or more charger communication lines 182 electrically connected to the microcontroller 180. The one or more charger communication lines 182 are I2C communication lines. With reference to FIGS. 1A and 1B, the one or more charger communication lines 182 include at least a charger SDA line 182a and a charger SCL line 182b. In some embodiments, the one or more charger communication lines 182 are configured to be electrically connected to the corresponding one or more battery communication lines 214 of the battery pack 20 upon coupling of the battery pack 20 to the charger 10. With reference to FIG. 1B, the charger communication lines 182 are electrically connected to the corresponding battery communication lines 214 of the battery pack 20 upon coupling of the battery pack 20 to the charger 10. Specifically, upon coupling of the battery pack 20 to the charger 10, the charger SDA and SCL lines 182a, 182b are electrically connected to the battery SDA and SCL lines 214a, 214b, respectively.

In some embodiments, the microcontroller 180 of the charger 10 may be considered as the master controller and the fuel gauge IC 216 of the battery pack 20 may be considered as the slave device. With reference to FIG. 1B, upon coupling of the battery pack 20 to the charger 10, the relevant data of the battery pack 20 stored in the fuel gauge IC 216 is transferred from the fuel gauge IC 216 to the microcontroller 180, via the battery and charger communication lines 214, 182, when the battery pack 20 is in the active state. Specifically, the relevant data of the battery pack 20 stored in the fuel gauge IC 216 is transferred from the fuel gauge IC 216 to the microcontroller 180, via the battery and charger SDA lines 214a, 182a. A clock signal is set by the battery and charger SCL lines 214b, 182b to synchronize the data transfer between the microcontroller 180 and the fuel gauge IC 216.

In some embodiments, the microcontroller 180 is further configured to determine that the battery pack 20 is disconnected from the charger 10 upon not receiving the communication signals from the one or more battery communication lines 214 for a predetermined time period. With reference to FIG. 1A, the microcontroller 180 determines that the battery pack 20 is disconnected from the charger 10 upon not receiving the communication signals from the one or more battery communication lines 214 for the predetermined time period. In some embodiments, the predetermined time period may be selected or determined by the microcontroller 180.

In some embodiments, the microcontroller 180 is further configured to control the analog switch 150 to electrically disconnect the sense pin 108 from the charger sense line 116 until the battery pack 20 is sensed by the microcontroller 180. In some embodiments, the analog switch 150 is configured to electrically disconnect the sense pin 108 from the charger sense line 116 when the battery pack 20 is disconnected from the charger 10. With reference to FIG. 1A, the analog switch 150 electrically disconnects the sense pin 108 from the charger sense line 116 when the battery pack 20 is disconnected from the charger 10. Specifically, the microcontroller 180 controls the analog switch 150 to electrically disconnect the sense pin 108 from the charger sense line 116 when the battery pack 20 is disconnected from the charger 10, or until the battery pack 20 is sensed by the microcontroller 180.

In some embodiments, the analog switch 150 includes a first terminal 152 electrically connected to the sense pin 108 of the charger IC 102, a second terminal 154 electrically connected to the charger output line 112, and a third terminal 156 electrically connected to the charger sense line 116. In some embodiments, the analog switch 150 is configured to selectively connect the first terminal 152 to one of the second terminal 154 and the third terminal 156. In some embodiments, the analog switch 150 is further configured to electrically connect the first terminal 152 to the second terminal 154 when the battery pack 20 is disconnected from the charger 10. With reference to FIG. 1A, the analog switch 150 electrically connects the first terminal 152 to the second terminal 154 when the battery pack 20 is disconnected from the charger 10. In other words, when the battery pack 20 is disconnected from the charger 10, the sense pin 108 of the charger IC 102 may be electrically connected to the charger output line 112, via the first and second terminals 152, 154 of the analog switch 150. The analog switch 150 further includes a selection terminal 157. The switch state of the analog switch 150 can be selected or controlled by providing a signal at the selection terminal 157. The selection terminal 157 can be used to selectively connect the first terminal 152 to one of the second terminal 154 and the third terminal 156.

In the illustrated embodiment, the control line 181 electrically connects the selection terminal 157 of the analog switch 150 to the microcontroller 180. The microcontroller 180 can control or select the switch state of the analog switch 150 by providing control signals at the selection terminal 157. Specifically, the microcontroller 180 can selectively connect the first terminal 152 to one of the second terminal 154 and the third terminal 156 by applying control signals at the selection terminal 157 of the analog switch 150 via the control line 181.

In some embodiments, the charger 10 further includes an intermediate line 120 electrically connecting the second terminal 154 of the analog switch 150 to the charger output line 112. Therefore, when the battery pack 20 is disconnected from the charger 10, the sense pin 108 of the charger IC 102 is electrically connected to the charger output line 112, via the analog switch 150 and the intermediate line 120 of the charger 10.

When the battery pack 20 is not coupled to the charger 10, the electrical connection of the sense pin 108 and the charger output line 112, via the analog switch 150, may prevent an unregulated charger output voltage due to an otherwise open charger sense line 116. Therefore, upon disconnection of the battery pack 20 from the charger 10, the electrical connection of the sense pin 108 and the charger output line 112, via the analog switch 150, may prevent any damage to the charger IC 102 due to an otherwise open condition of the charger sense line 116 and the unregulated charger output voltage.

In some embodiments, the microcontroller 180 is further configured to sense the battery pack 20 upon receiving the communication signals from the one or more battery communication lines 214 via the one or more charger communication lines 182. In other words, the microcontroller 180 senses the battery pack 20 upon receiving the communication signals or the relevant data from the fuel gauge IC 216, via the battery and charger communication lines 214, 182. Therefore, when the microcontroller 180 receives the communication signals from the one or more battery communication lines 214 via the one or more charger communication lines 182, the microcontroller 180 determines that the battery pack 20 is coupled to the charger 10.

In some embodiments, upon receiving the communication signals from the one or more battery communication lines 214, the microcontroller 180 is further configured to control the analog switch 150 to electrically connect the sense pin 108 to the charger sense line 116 and activate the charger IC 102. In some embodiments, the analog switch 150 is configured to electrically connect the sense pin 108 of the charger IC 102 to the battery sense line 204 of the battery pack 20 upon sensing of the battery pack 20 by the charger 10. With reference to FIG. 1B, upon receiving the communication signals from the one or more battery communication lines 214, the microcontroller 180 controls the analog switch 150 to electrically connect the sense pin 108 to the battery sense line 204.

Referring to FIG. 1B, when the battery pack 20 is coupled to the charger 10, the battery input and sense lines 202, 204 are electrically connected to the charger output and sense lines 112, 116, respectively. In some embodiments, upon electrical connection of the battery input line 202 and the battery sense line 204 of the battery pack 20 to the charger output line 112 and the charger sense line 116, respectively, of the charger 10, the analog switch 150 is further configured to electrically connect the first terminal 152 to the third terminal 156. With reference to FIG. 1B, the to analog switch 150 electrically connects the first terminal 152 to the third terminal 156 upon electrical connection of the battery input line 202 and the battery sense line 204 to the charger output line 112 and the charger sense line 116, respectively. In other words, when the battery pack 20 is coupled to the charger 10, the sense pin 108 of the charger IC 102 is electrically connected to the battery sense line 204 of the battery pack 20, via the first and third terminals 152, 156 of the analog switch 150.

Figure 2A:
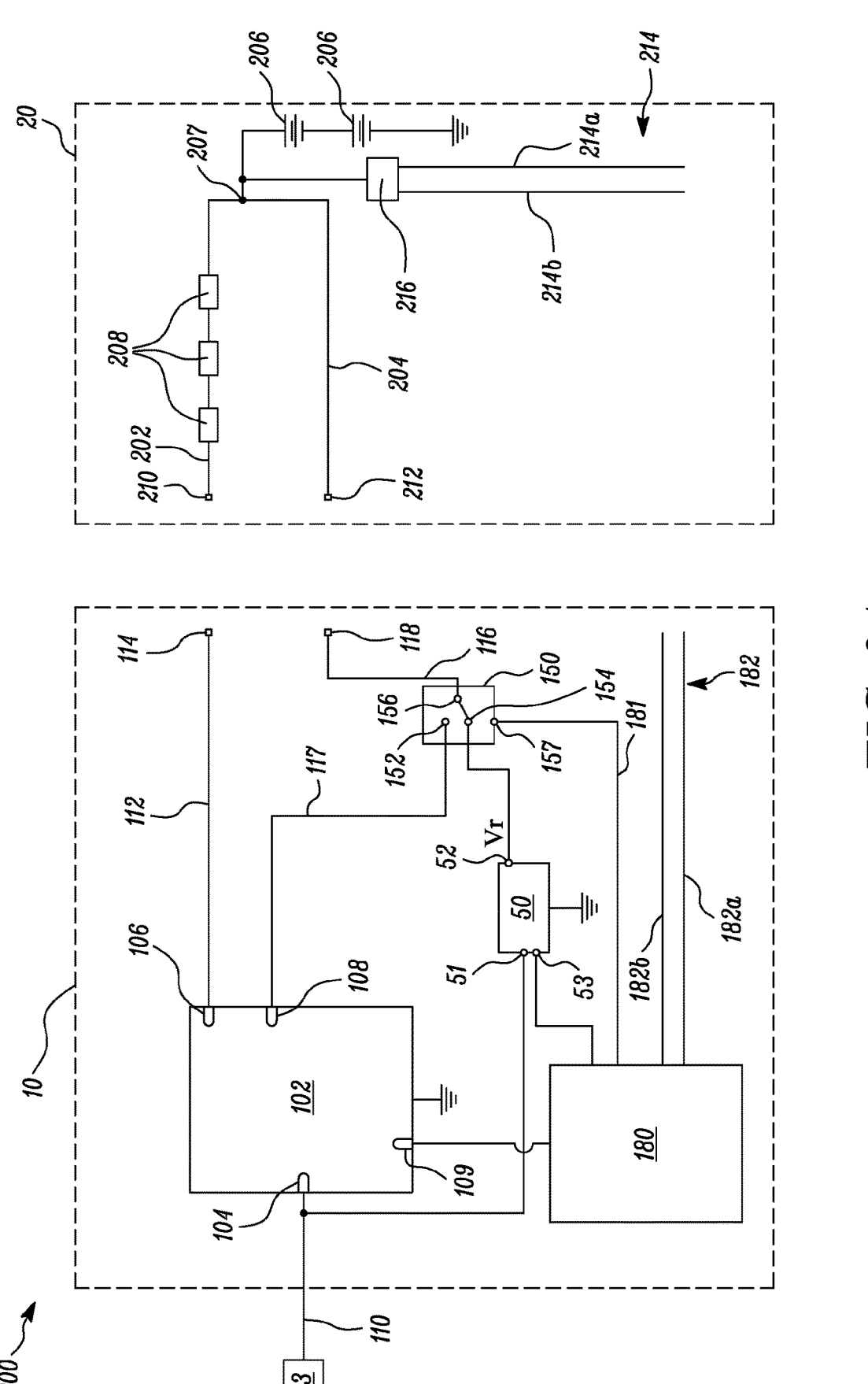
FIG. 2A is a block diagram of the charging system of FIG. 1A, wherein the battery pack is disconnected from the charger, according to another embodiment of the present disclosure.
Figure 2B:
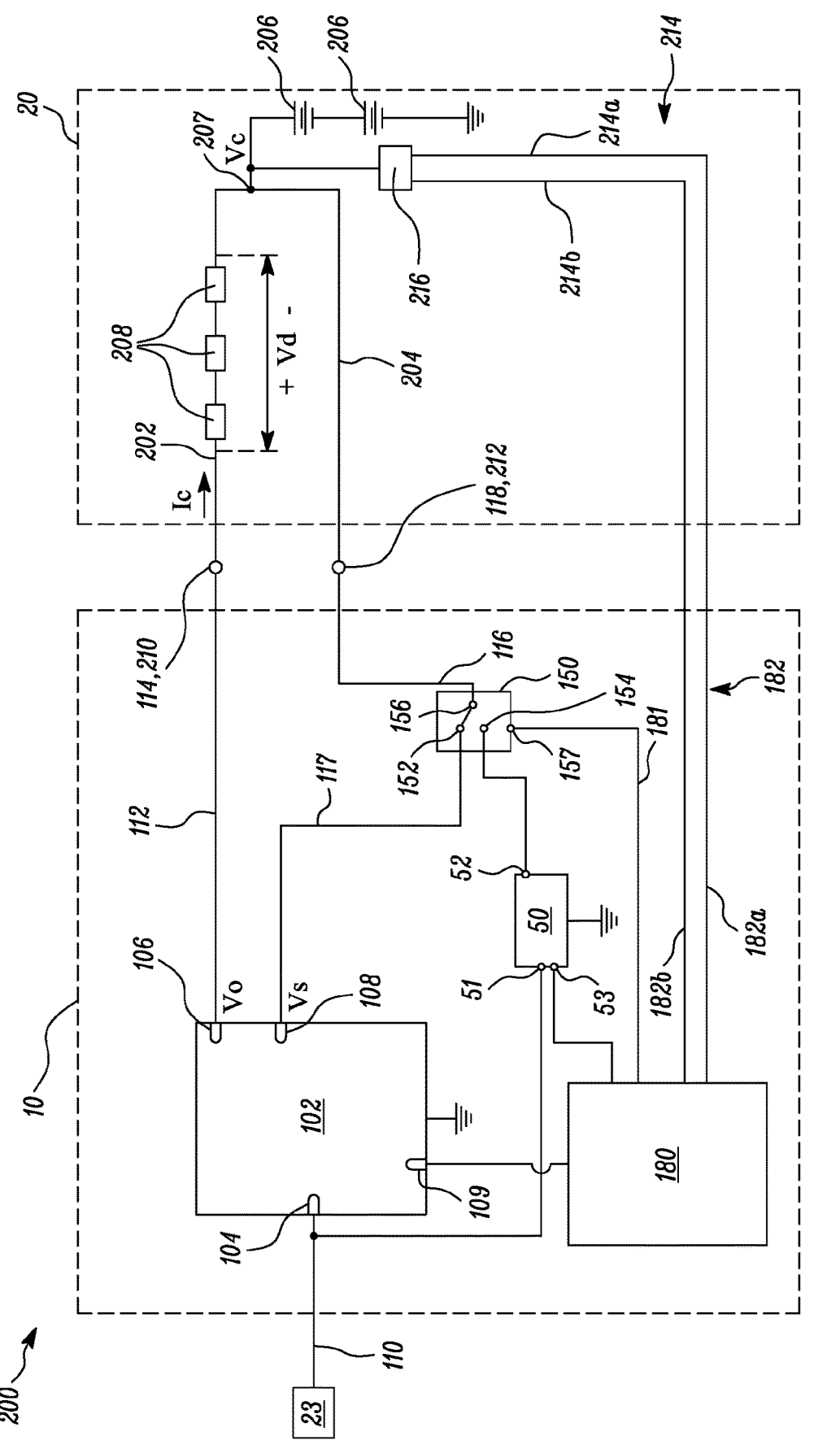
FIG. 2B is a block diagram of the charging system of FIG. 2A, wherein the battery pack is coupled to the charger.

FIGS. 2A and 2B illustrate a charging system 200 according to another embodiment of the present disclosure. The charging system 200 is substantially similar to the charging system 100 illustrated in FIGS. 1A and 1B. Common components between the charging systems 100, 200 are illustrated by the same reference numerals. However, the charging system 200 includes a voltage regulator 50 electrically connected to the analog switch 150. In some embodiments, the charger 10 includes the voltage regulator 50 electrically connected to the analog switch 150. The voltage regulator 50 may be designed to maintain a constant output voltage level. The voltage regulator 50 may use an electromechanical mechanism, or electronic components.

In some embodiments, the voltage regulator 50 is a low dropout (LDO) voltage regulator 50. The LDO voltage regulator provides a stable power supply voltage independent of load impedance, input-voltage variations, temperature, and time. For the LDO voltage regulator 50, there is a small voltage drop between an input voltage and an output voltage. The LDO voltage regulator 50 provides a continuously controlled, steady, low-noise output voltage.

In some embodiments, the voltage regulator 50 is a switching voltage regulator. Generally, the switching voltage regulator is also referred to as DC-to-DC converter and used to provide a constant output voltage using an inductor as a means for energy storage. The switching voltage regulator typically provides power supply function through low loss components, such as capacitors, inductors, and transformers, and power switches that are turned on and off to transfer energy from an input to an output. In common applications, the switching voltage regulator can be used to step up the input voltage or step down the input voltage or both. Specifically, a buck switching regulator, also called a buck converter, steps down the input voltage while a boost switching regulator, also called a boost converter, steps up the input voltage. A buck-boost switching regulator, or buck-boost converter, provides both step-up and step-down functions.

In some embodiments, the voltage regulator 50 is electrically connected to the power source 23. Specifically, the voltage regulator 50 is electrically connected to the power supply line 110 that supplies electrical power from the power source 23 to the voltage regulator 50 as well as the input pin 104 of the charger IC 102.

Further, the voltage regulator 50 is electrically connected to the microcontroller 180. In some embodiments, the analog switch 150 is further configured to electrically connect the voltage regulator 50 to the charger sense line 116 until the battery pack 20 is sensed by the charger 10. With reference to FIG. 2A, the analog switch 150 electrically connects the voltage regulator 50 to the charger sense line 116 when the battery pack 20 is disconnected from the charger 10. Moreover, in some embodiments, the microcontroller 180 is further configured to control the analog switch 150 to electrically connect the voltage regulator 50 to the charger sense line 116 until the battery pack 20 is sensed by the microcontroller 180. With reference to FIG. 2A, the microcontroller 180 controls the analog switch 150 to electrically connect the voltage regulator 50 to the charger sense line 116 until the battery pack 20 is sensed by the microcontroller 180.

In the illustrated embodiment of FIGS. 2A and 2B, the voltage regulator 50 includes an input 51, an output 52, and a control 53. The input 51 of the voltage regulator 50 is electrically connected to the power supply 110. The output 52 of the voltage regulator 50 is electrically connected to the second terminal 154 of the analog switch 150. The control 53 of the voltage regulator 50 is electrically connected to the microcontroller 180. The voltage regulator 50 may provide a regulated voltage "Vr" at the output 52 based on an input voltage received at the input 51. Further, the microcontroller 180 may activate or deactivate the voltage regulator 50 by providing a control signal at the control 53 of the voltage regulator 50. Further, the microcontroller 180 may control the voltage regulator 50 via the control 53. For example, the microcontroller 180 may regulate the regulated voltage "Vr" via the control 53.

In some embodiments, the analog switch 150 includes the first terminal 152 electrically connected to the sense pin 108 of the charger IC 102, the second terminal 154 electrically connected to the voltage regulator 50, and the third terminal 156 electrically connected to the charger sense line 116. In some embodiments, the analog switch 150 is configured to selectively connect the third terminal 156 to one of the first terminal 152 and the second terminal 154. With reference to FIG. 2A, the analog switch 150 is further configured to electrically connect the second terminal 154 to the third terminal 156 until the battery pack 20 is sensed by the charger 10. In some embodiments, the microcontroller 180 is further configured to control the analog switch 150 to electrically connect the second terminal 154 to the third terminal 156 until the battery pack 20 is sensed by the microcontroller 180. Therefore, the microcontroller 180 controls the analog switch 150 to electrically connect the second terminal 154 to the third terminal 156 when the battery pack 20 is electrically disconnected from the charger 10.

With reference to FIG. 2B, the analog switch 150 is further configured to electrically connect the first terminal 152 to the third terminal 156 upon sensing of the battery pack 20 by the charger 10. In some embodiments, the microcontroller 180 is further configured to control the analog switch 150 to electrically connect the first terminal 152 to the third terminal 156 upon sensing of the battery pack 20 by the microcontroller 180. Therefore, the microcontroller 180 controls the analog switch 150 to electrically connect the first terminal 152 to the third terminal 156 when the battery pack 20 is electrically coupled to the charger 10.

In some embodiments, the first terminal 152 and the second terminal 154 may correspond to input terminals of the analog switch 150, while the third terminal 156 may correspond to an output terminal of the analog switch 150. At a given time, the output terminal is selectively connected to one of the input terminals.

In some embodiments, the voltage regulator 50 is further configured to output the regulated voltage "Vr" to the charger sense line 116 when the voltage regulator 50 is electrically connected to the charger sense line 116. With reference to FIG. 2A, the voltage regulator 50 outputs the regulated voltage "Vr" to the charger sense line 116 when the second terminal 154 is electrically connected to the third terminal 156. Further, the voltage regulator 50 is electrically connected to the charger sense line 116 via the second and third terminals 154, 156.

Upon coupling of the battery pack 20 to the charger 10, the regulated voltage "Vr" is fed to the battery sense line 204 from the charger sense line 116. In other words, upon electrical connection of the battery input line 202 and the battery sense line 204 of the battery pack 20 to the charger output line 112 and the charger sense line 116, respectively, the regulated voltage "Vr" is fed to the charger and battery sense lines 116, 204. For the battery pack 20 in the inactive state, the fuel gauge IC 216 does not output the communication signals. In some embodiments, the voltage regulator 50 is configured to switch the battery pack 20 from the inactive state to the active state via the regulated voltage "Vr" provided to the battery sense line 204. The regulated voltage "Vr" is applied on the battery sense line 204, such that the fuel gauge IC 216 can detect the regulated voltage "Vr" at the node 207. In some cases, the regulated voltage "Vr" may activate the battery pack 20. For example, upon coupling the battery pack 20 in an inactive or a dead battery condition to the charger 10, charging of the battery pack 20 may not be initialized as the fuel gauge IC 216 may be in switched off and unable to output the communication signals to the microcontroller 180 of the charger 10. In such cases, the regulated voltage "Vr" from the voltage regulator 50 may be applied at the node 207 in order to switch on the fuel gauge IC 216 so that the battery pack 20 can be sensed by the microcontroller 180 and charging of the battery pack 20 can be initiated. Further, the battery sense line 204 provides a low impedance path to the regulated voltage "Vr" bypassing the at least one blocking device 208. Therefore, a relative low value of the regulated voltage "Vr" may be sufficient to activate the battery pack 20. In some embodiments, the microcontroller 180 may switch off or deactivate the voltage regulator 50 upon sensing the battery pack 20.

In some examples, when the battery pack 20 in the dead battery condition is coupled to the charger 10, the fuel gauge IC 216 does not output the communication signals to the microcontroller 180 via the battery and charger communication lines 214, 182. While the battery pack 20 is in the dead battery condition and coupled to the charger 10, the microcontroller 180 may not activate the charger IC 102, and the sense pin 108 may not be electrically connected to the charger sense line 116. While the charger IC 102 is not activated, the voltage regulator 50 may be electrically connected to the charger sense line 116. Thus, upon connecting the battery pack 20 in the dead battery condition with the charger 10, the voltage regulator 50 may provide the regulated voltage "Vr" at a low current to the charger and battery sense lines 116, 204, to incrementally charge the electrochemical cells 206 and activate the battery pack 20 in the dead battery condition. Therefore, the charging system 200 including the voltage regulator 50 and the analog switch 150 may be used to wake up or activate the battery pack 20 in the dead battery condition when coupled to the charger 10. In other words, for the battery pack 20 coupled to the charger 10 in the dead battery condition, the voltage regulator 50 may provide a reviving voltage, via the battery sense line 204, to activate the battery pack 20.

Once the battery pack 20 is activated, the battery pack 20 may be switched from the inactive state to the active state. Therefore, the fuel gauge IC 216 may start outputting the communication signals to the microcontroller 180 via the battery communication lines 214. Upon receiving the communication signals from the battery communication lines 214, via the charger communication lines 182, the microcontroller 180 may sense the battery pack 20. Upon sensing of the battery pack 20 by the microcontroller 180, the microcontroller 180 may activate the charger IC 102 of the charger 10. Further, upon sensing of the battery pack 20 by the microcontroller 180, the microcontroller 180 may control the analog switch 150 to electrically disconnect the third terminal 156 and the second terminal 154, and electrically connect the third terminal 156 to the first terminal 152. The charger IC 102 may provide the output voltage "Vo", via the charger output line 112, to the battery input line 202 to supply power for recharging the electrochemical cells 206 in the battery pack 20. With reference to FIG. 2B, the voltage regulator 50 is electrically disconnected from the charger sense line 116, and the sense pin 108 of the charger IC 102 is electrically connected to the charger sense line 116.

Therefore, the voltage regulator 50 may enable the charger 10 to activate, detect and charge the battery pack 20 whose safety switch (not shown in FIGS. 2A and 2B) is engaged due to a prior faulty condition and is initially in an inactive state.

Figure 3A:
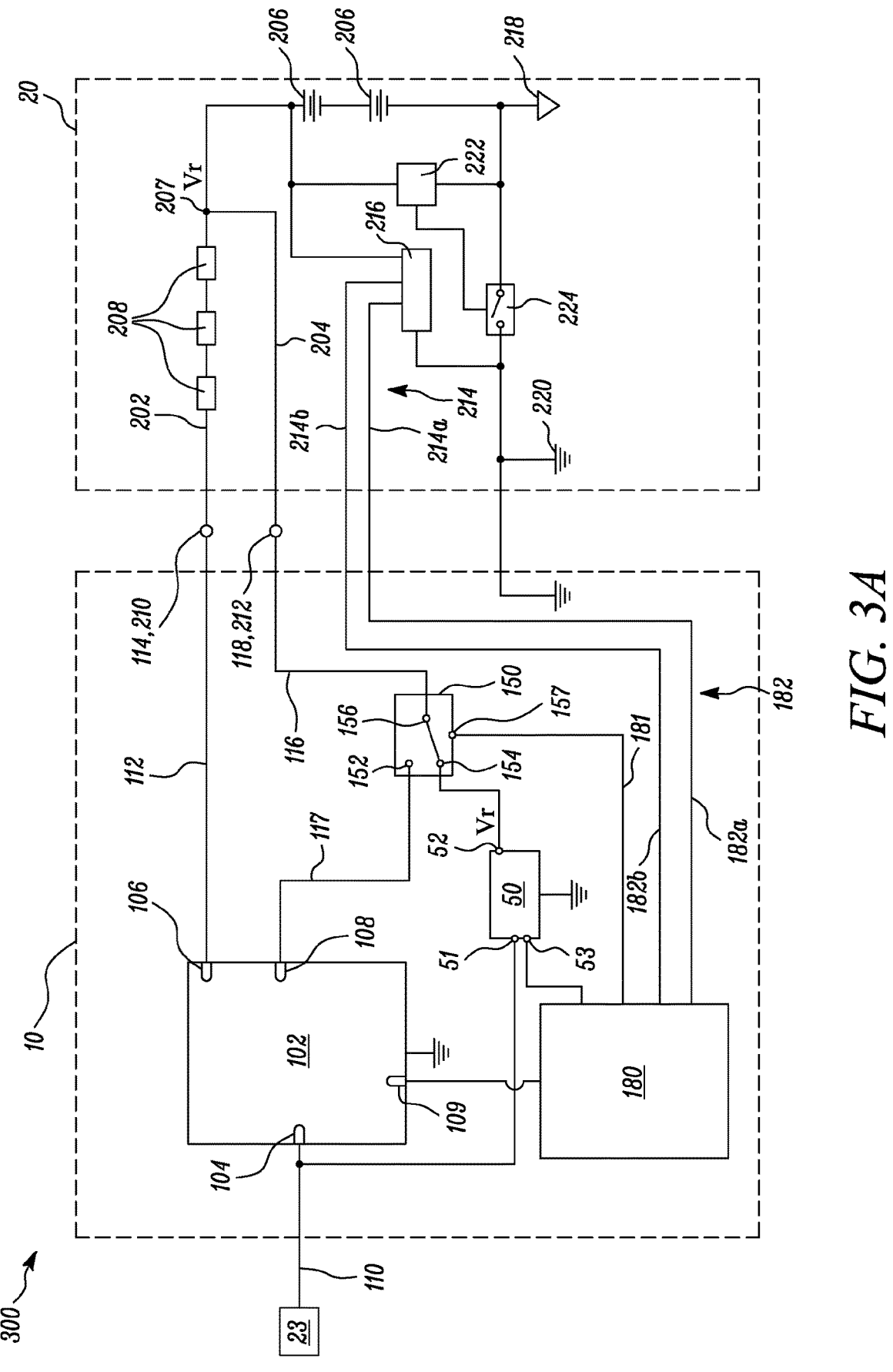
FIG. 3A is a detailed block diagram of the charging system of FIG. 2B, according to another embodiment of the present disclosure.
Figure 3B:
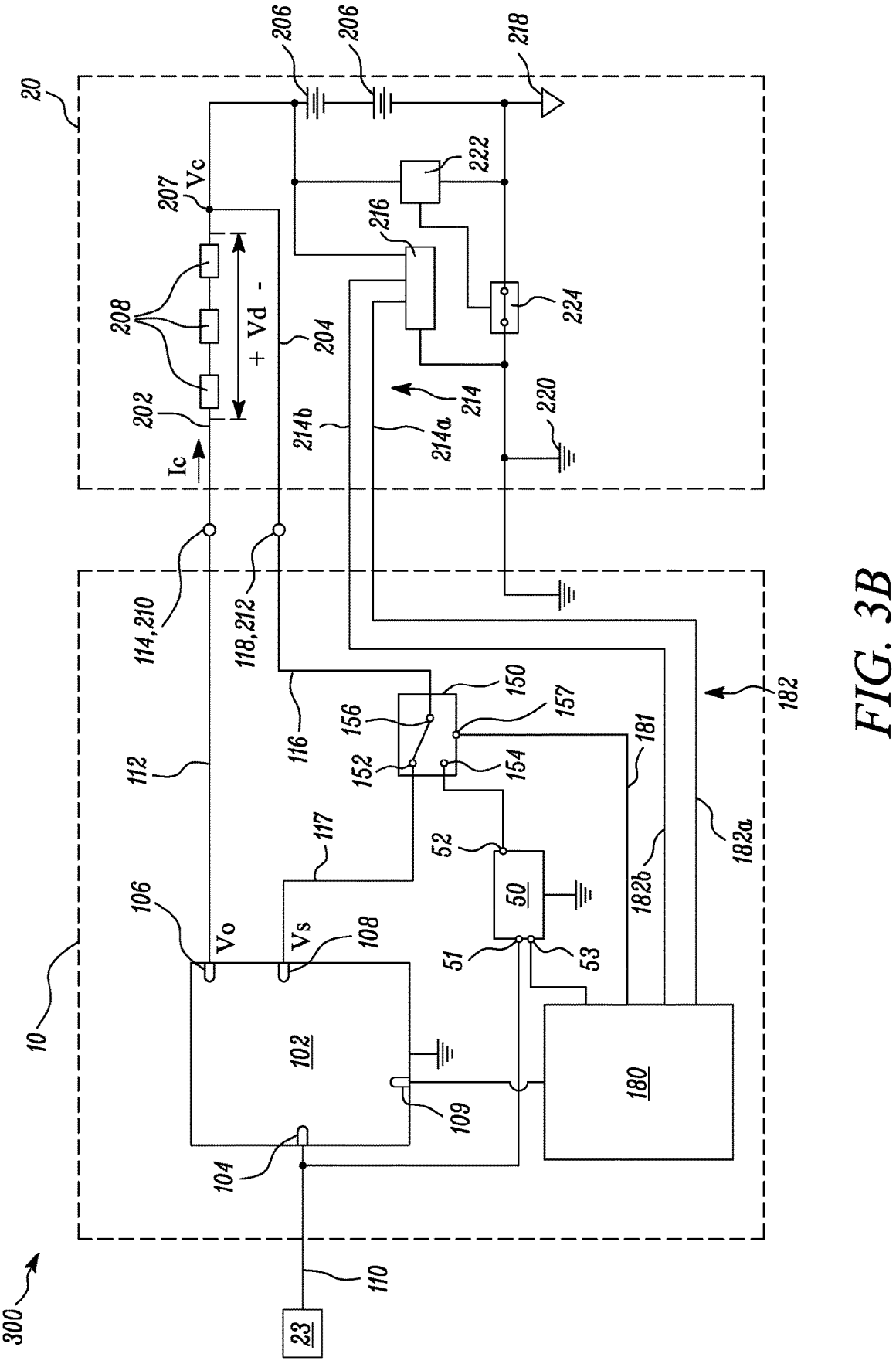
FIG. 3B is another detailed block diagram of the charging system of FIG. 3A.
Figure 4:
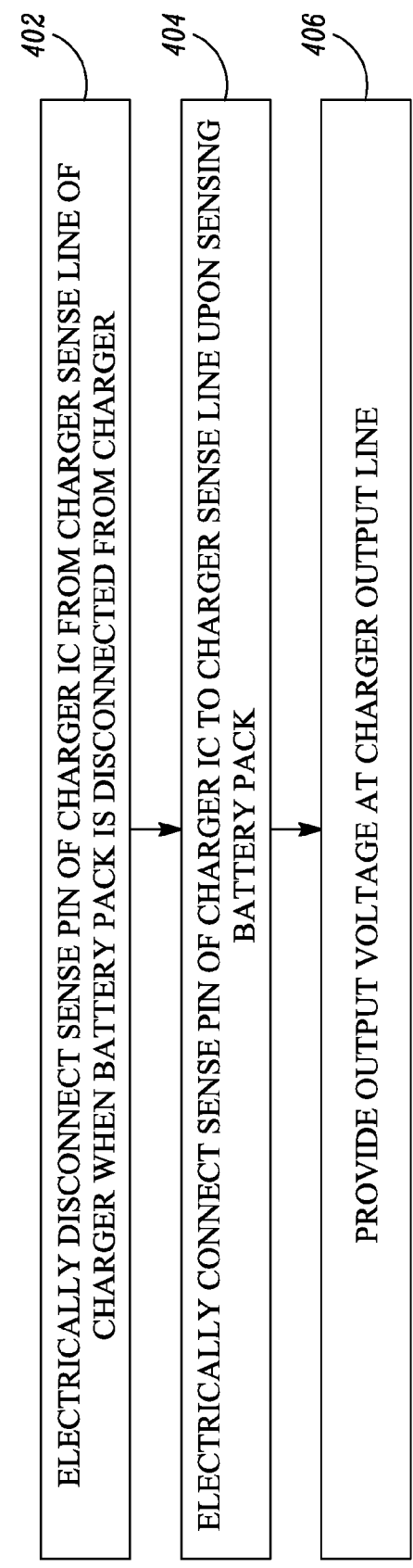
FIG. 4 is a flowchart for a method of charging the battery pack using the charger, according to an embodiment of the present disclosure.

FIGS. 3A and 3B illustrate a charging system 300 according to another embodiment of the present disclosure. The charging system 300 is substantially similar to the charging system 200 illustrated in FIGS. 2A and 2B. Common components between the charging systems 200, 300 are illustrated by the same reference numerals. However, in the charging system 300, the battery pack 20 further includes a cell ground 218 electrically connected to the one or more electrochemical cells 206, a battery ground 220, a battery protection IC 222 electrically connected to the one or more electrochemical cells 206 and the fuel gauge IC 216, and a semiconductor switch 224 electrically disposed between the cell ground 218 and the battery ground 220. The semiconductor switch 224 is electrically connected to the battery protection IC 222. The battery protection IC 222 is also electrically connected to the node 207.

In the illustrated embodiment of FIGS. 3A and 3B, the cell ground 218 may be a signal ground, while the battery ground 220 may be an earth ground. A voltage applied to the one or more electrochemical cells 206 may be measured with respect to the cell ground 218. The battery ground 220 may be used for zero potential reference.

In some embodiments, the battery pack 20 is in the inactive state when the cell ground 218 is electrically disconnected from the battery ground 220. In other words, the fuel gauge IC 216 does not output the communication signals when the cell ground 218 is electrically disconnected from the battery ground 220. Further, the battery pack 20 may be in the dead battery condition when the cell ground 218 is electrically disconnected from the battery ground 220. In some embodiments, the battery protection IC 222 is configured to control the semiconductor switch 224 to electrically disconnect the cell ground 218 from the battery ground 220 in order to switch the battery pack 20 from the active state to the inactive state. With reference to FIG. 3A, the battery protection IC 222 controls the semiconductor switch 224, such that the cell ground 218 is electrically disconnected from the battery ground 220 and thus, the battery pack 20 is in the inactive state.

Further, in some embodiments, the battery protection IC 222 also monitors a voltage across the electrochemical cells 206. Whenever the battery pack 20 is subjected to an over voltage condition, the battery protection IC 222 electrically disconnects the cell ground 218 from the battery ground 220. In some embodiments, the battery protection IC 222 detects a fault condition or an abnormal condition in the battery pack 20. In some embodiments, the battery protection IC 222 detects various conditions in the battery pack 20, such as over-charging, over discharging, etc.

Further, upon not receiving the communication signals from the fuel gauge IC 216 via the battery and charger communication lines 214, 182, the microcontroller 180 determines that the battery pack 20 is disconnected from the charger. In an example, the battery pack 20 in the dead battery condition and electrically connected to the battery pack 20, also corresponds to the inactive state of the battery pack 20. Consequently, the microcontroller 180 does not activate the charger IC 102, and the sense pin 108 is not electrically connected to the charger sense line 116. Further, when the charger IC 102 is not activated, the voltage regulator 50 is electrically connected to the charger sense line 116. The voltage regulator 50 provides the regulated voltage "Vr" to the charger and battery sense lines 116, 204.

In some embodiments, the battery pack 20 is in the active state when the cell ground 218 is electrically connected to the battery ground 220. In other words, the fuel gauge IC 216 outputs the communication signals when the cell ground 218 is electrically connected to the battery ground 220. In some embodiments, the battery protection IC 222 is configured to control the semiconductor switch 224 to electrically connect the cell ground 218 and the battery ground 220 in order to switch the battery pack 20 from the inactive state to the active state. With reference to FIG. 3B, the battery protection IC 222 controls the semiconductor switch 224, such that the cell ground 218 is electrically connected to the battery ground 220 and thus, the battery pack 20 is in the active state.

In some embodiments, the battery protection IC 222 is configured to control the semiconductor switch 224 to electrically connect the cell ground 218 and the battery ground 220 to switch the battery pack 20 from the inactive state to the active state upon application of the regulated voltage "Vr" from the voltage regulator 50 on the battery sense line 204. The regulated voltage "Vr" may be applied at the node 207. The battery protection IC 222 may control the semiconductor switch 224 to electrically connect the cell ground 218 and the battery ground 220 upon detecting the regulated voltage "Vr" applied to the node 207.

Once the battery pack 20 is in the active state, the fuel gauge IC outputs the communication signals to the microcontroller 180 via the battery communication lines 214. Upon receiving the communication signals from the battery communication lines 214 via the charger communication lines 182, the microcontroller 180 senses the insertion of the battery pack 20. Upon sensing of the battery pack 20 by the microcontroller 180, the microcontroller 180 activates the charger IC 102 of the charger 10. Further, upon sensing of the battery pack 20 by the microcontroller 180, the microcontroller 180 controls the analog switch 150 to electrically disconnect the voltage regulator 50 and the charger sense line 116. In other words, upon sensing of the battery pack 20 by the microcontroller 180, the microcontroller 180 controls the analog switch 150 to electrically disconnect the third terminal 156 and the second terminal 154, and electrically connect the third terminal 156 to the first terminal 152. The charger IC 102 provides the output voltage "Vo", via the charger output line 112, to the battery input line 202 to supply power for recharging the electrochemical cells 206 in the battery pack 20. With reference to FIG. 3B, the voltage regulator 50 is electrically disconnected from the charger sense line 116, and the sense pin 108 of the charger IC 102 is electrically connected to the charger sense line 116.

Referring to FIGS. 1A to 4, a flowchart for a method 400 of charging the battery pack 20 using the charger 10 having the charger IC 102 is illustrated. At step 402, the method 400 includes electrically disconnecting, by the analog switch 150, the sense pin 108 of the charger IC 102 from the charger sense line 116 of the charger 10 when the battery pack 20 is disconnected from the charger 10. The method 400 further includes sensing, by the microcontroller 180, the battery pack 20.

Moreover, sensing the battery pack 20 further includes receiving, by the microcontroller 180, the communication signals from the one or more battery communication lines 214 of the battery pack 20. The method 400 further includes determining, by the microcontroller 180, that the battery pack 20 is disconnected from the charger 10 upon not receiving the communication signals from the one or more battery communication lines 214 for the predetermined time period. The method 400 further includes controlling, by the microcontroller 180, the analog switch 150 to electrically disconnect the sense pin 108 from the charger sense line 116 until the battery pack 20 is sensed by the microcontroller 180. The method 400 further includes deactivating, by the microcontroller 180, the charger IC 102 until the battery pack 20 is sensed by the microcontroller 180.

At step 404, the method 400 includes electrically connecting, by the analog switch 150, the sense pin 108 of the charger IC 102 to the charger sense line 116 upon sensing the battery pack 20. The method 400 further includes controlling, by the microcontroller 180, the analog switch 150 to electrically connect the sense pin 108 to the charger sense line 116 upon receiving the communication signals from the one or more battery communication lines 214. The method 400 further includes activating, by the microcontroller 180, the charger IC 102 upon sensing the battery pack 20. The method 400 further includes activating, by the microcontroller 180, the charger IC 102 upon receiving the communication signals from the one or more battery communication lines 214.

The method 400 further includes electrically connecting, by the analog switch 150, the voltage regulator 50 to the analog switch 150, until the battery pack 20 is sensed by the charger 10. The method 400 further includes providing, by the voltage regulator 50, the regulated voltage "Vr" to the charger sense line 116 when the voltage regulator 50 is electrically connected to the charger sense line 116. The method 400 further includes providing the regulated voltage "Vr" from the voltage regulator 50 at the node 207 electrically disposed between the at least one blocking device 208 and the one or more electrochemical cells 206 upon coupling of the battery pack 20 to the charger 10. The method 400 further includes switching, by the battery protection IC 222, the battery pack 20 from the inactive state to the active state upon sensing the regulated voltage "Vr" provided at the node 207.

At step 406, the method 400 includes providing, by the charger IC, the output voltage "Vo" at the charger output line 112 based on the voltage "Vs" detected at the sense pin 108 of the charger 10. The charger output line 112 is electrically connected to one or more electrochemical cells 206 of the battery pack 20 upon coupling of the battery pack 20 to the charger 10.

The method 400 further includes allowing, by the at least one blocking device 208, the unidirectional flow of current from the charger output line 112 to the one or more electrochemical cells 206 of the battery pack 20.

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

The invention claimed is:

1. A charger for a battery pack having a battery input line, a battery sense line electrically connected to the battery input line, and one or more electrochemical cells electrically connected to the battery input line, the charger comprising:
   a charger integrated circuit (IC) comprising an input pin, an output pin, and a sense pin, wherein the input pin is configured to be electrically connected to a power source, and wherein the charger IC is configured to provide an output voltage at the output pin;

a charger output line electrically connected to the output pin of the charger IC, the charger output line configured to be electrically connected to the battery input line upon coupling of the battery pack to the charger;

a charger sense line configured to be electrically connected to the battery sense line upon coupling of the battery pack to the charger; and an analog switch electrically disposed between the charger sense line and the battery sense line, such that:

the analog switch is configured to electrically disconnect the sense pin from the charger sense line when the battery pack is disconnected from the charger;

the analog switch is configured to electrically connect the sense pin of the charger IC to the battery sense line of the battery pack upon sensing of the battery pack by the charger; and the charger IC is configured to control the output voltage based on a voltage detected at the sense pin of the charger IC.

2. The charger of claim 1, wherein the analog switch comprises a first terminal electrically connected to the sense pin of the charger IC, a second terminal electrically connected to the charger output line, and a third terminal electrically connected to the charger sense line, and wherein the analog switch is configured to selectively connect the first terminal to one of the second terminal and the third terminal.

3. The charger of claim 2, wherein the analog switch is further configured to electrically connect the first terminal to the second terminal when the battery pack is disconnected from the charger, and wherein, upon electrical connection of the battery input line and the battery sense line of the battery pack to the charger output line and the charger sense line, respectively, of the charger, the analog switch is further configured to electrically connect the first terminal to the third terminal.

4. The charger of claim 2, further comprising an intermediate line electrically connecting the second terminal of the analog switch to the charger output line.

5. The charger of claim 1, further comprises a microcontroller electrically connected to at least the charger IC and the analog switch and configured to sense the battery pack, wherein the microcontroller is further configured to deactivate the charger IC until the battery pack is sensed by the microcontroller, and wherein the microcontroller is further configured to activate the charger IC upon sensing the battery pack.

6. The charger of claim 5, further comprising one or more charger communication lines electrically connected to the microcontroller and configured to be electrically connected to corresponding one or more battery communication lines of the battery pack upon coupling of the battery pack to the charger, wherein the microcontroller is further configured to sense the battery pack upon receiving communication signals from the one or more battery communication lines via the one or more charger communication lines.

7. The charger of claim 6, wherein, upon receiving the communication signals from the one or more battery communication lines, the microcontroller is further configured to control the analog switch to electrically connect the sense pin to the charger sense line and activate the charger IC.

8. The charger of claim 6, wherein the microcontroller is further configured to determine that the battery pack is disconnected from the charger upon not receiving the communication signals from the one or more battery communication lines for a predetermined time period.

9. The charger of claim 5, wherein the microcontroller is further configured to control the analog switch to electrically disconnect the sense pin from the charger sense line until the battery pack is sensed by the microcontroller.

10. The charger of claim 1, further comprises a voltage regulator electrically connected to the analog switch, wherein the analog switch is further configured to electrically connect the voltage regulator to the charger sense line until the battery pack is sensed by the charger.

11. The charger of claim 10, wherein the analog switch comprises a first terminal electrically connected to the sense pin of the charger IC, a second terminal electrically connected to the voltage regulator, and a third terminal electrically connected to the charger sense line, and wherein the analog switch is configured to selectively connect the third terminal to one of the first terminal and the second terminal.

12. The charger of claim 11, wherein the analog switch is further configured to electrically connect the second terminal to the third terminal until the battery pack is sensed by the charger, and wherein the analog switch is further configured to electrically connect the first terminal to the third terminal upon sensing of the battery pack by the charger.

13. The charger of claim 10, wherein the voltage regulator is a low dropout (LDO) voltage regulator.

14. The charger of claim 10, wherein the voltage regulator is a switching voltage regulator.

15. The charger of claim 10, wherein the voltage regulator is electrically connected to the power source.

16. The charger of claim 10, wherein the voltage regulator is further configured to output a regulated voltage to the charger sense line when the voltage regulator is electrically connected to the charger sense line.

17. The charger of claim 1, further comprises a power supply line configured to supply electrical power from the power source to the input pin of the charger IC.

18. The charger of claim 1, further comprising:

a charger output terminal electrically connected to the charger output line and configured to be electrically connected to the battery input line; and a charger sense terminal electrically connected to the charger sense line and configured to be electrically connected to the battery sense line.

19. A charging system comprising:

a battery pack comprising:

a battery input line;

one or more electrochemical cells electrically connected to the battery input line;

at least one blocking device disposed in the battery input line and configured to allow a unidirectional flow of current from the battery input line to the one or more electrochemical cells; and a battery sense line electrically connected to the battery input line between the one or more electrochemical cells and the at least one blocking device, such that the battery sense line is configured to detect a voltage drop across the at least one blocking device; and a charger configured to be selectively coupled to the battery pack, the charger comprising:

a charger integrated circuit (IC) comprising an input pin, an output pin, and a sense pin, wherein the input pin is configured to be electrically connected to a power source, and wherein the charger IC is configured to provide an output voltage at the output pin;

a charger output line electrically connected to the output pin of the charger IC, the charger output line configured to be electrically connected to the battery input line upon coupling of the battery pack to the charger;

a charger sense line configured to be electrically connected to the battery sense line upon coupling of the battery pack to the charger; and an analog switch electrically disposed between the charger sense line and the battery sense line, such that:

the analog switch is configured to electrically disconnect the sense pin from the charger sense line when the battery pack is disconnected from the charger;

the analog switch is configured to electrically connect the sense pin of the charger IC to the battery sense line of the battery pack upon sensing of the battery pack by the charger; and the charger IC is configured to control the output voltage based on a voltage detected at the sense pin of the charger IC, wherein the voltage detected at the sense pin of the charger IC is based on the voltage drop across the at least one blocking device.

20. A method of charging a battery pack using a charger having a charger integrated circuit (IC), the method comprising:

electrically disconnecting, by an analog switch, a sense pin of the charger IC from a charger sense line of the charger when the battery pack is disconnected from the charger;

electrically connecting, by the analog switch, the sense pin of the charger IC to the charger sense line upon sensing the battery pack; and providing, by the charger IC, an output voltage at a charger output line based on a voltage detected at the sense pin of the charger, wherein the charger output line is electrically connected to one or more electrochemical cells of the battery pack upon coupling of the battery pack to the charger.

* * * * *